Oct. 12, 1937.    K. D. McMAHAN    2,095,824
FLUID SYSTEM
Original Filed May 22, 1935
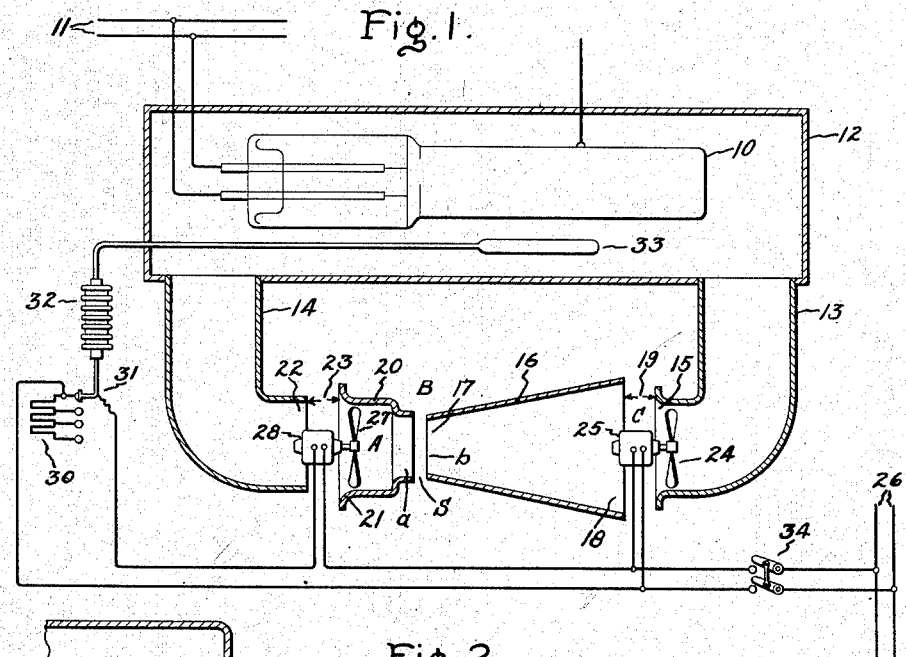
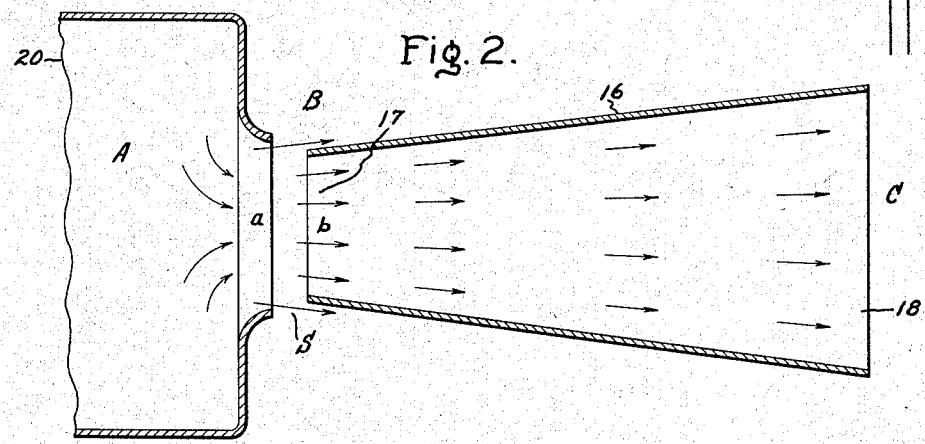
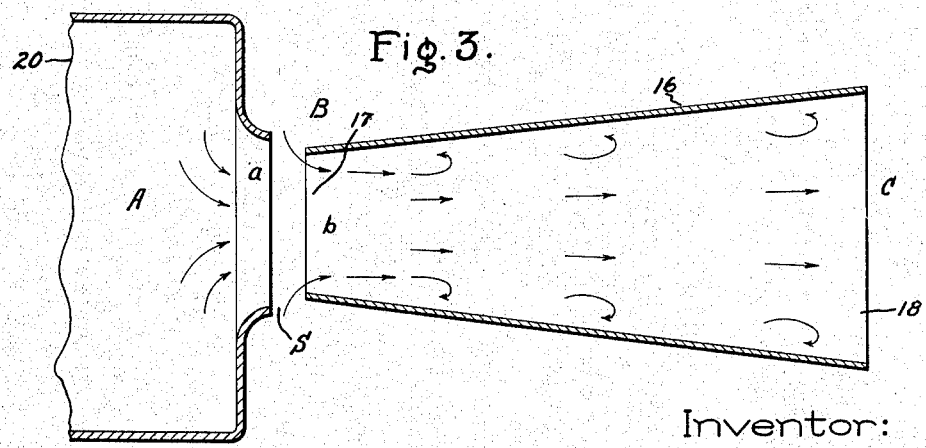
Inventor:
Kenton D. McMahan,
by Harry E. Dunham
His Attorney.

Patented Oct. 12, 1937

2,095,824

UNITED STATES PATENT OFFICE 2,095,824

FLUID SYSTEM

Kenton D. McMahan, Scotia, N. Y., assignor to General Electric Company, a corporation of New York Original application May 22, 1935, Serial No. 22,751. Divided and this application November 18, 1936, Serial No. 111,443

5 Claims. (Cl. 236—49)

The present invention relates to fluid systems and has for a general object the provision of a fluid system with improved fluid flow control apparatus for controlling automatically a flow of fluid in response to variations in the conditions producing the fluid flow.

The present application is a division of my pending application, Serial No. 22,751, filed May 22, 1935, which is assigned to the same assignee as the present invention, and a specific object of the invention to which the present application is directed is the provision of an improved ventilation system incorporating the variable impedance fluid flow control apparatus described in detail and broadly claimed in my above referred to pending application for controlling the circulation of air through, and thereby the temperature within, an enclosure.

A more specific object of the present invention is the provision in a ventilation system of improved apparatus for controlling automatically the proportions of fresh and recirculated air supplied to an enclosure in accordance with variations in a predetermined condition within the enclosure.

Both with respect to the broader aspects of my invention as set forth in my previously referred to application and the more specific aspects of the invention as set forth in the present application, it may be stated that the invention consists generally in the provision in a fluid system of a duct and a plurality of orifices arranged in such cooperating relationship therewith that under one set of pressure conditions fluid is delivered from a single source, or from one of two independent sources, through certain of the orifices to the duct in such manner that a minimum of contraction is produced in the fluid stream entering the duct and the efficiency of conversion of velocity head to static head is a maximum; and that, under another set of pressure conditions, fluid is delivered from the single source, or from the other of the two independent sources as the case may be, through certain others of the orifices to the duct in such manner that a maximum of contraction of the fluid stream entering the duct is produced and the efficiency of conversion of velocity head to static head is a minimum.

Further objects of my invention and the details of the manner in which the invention may be carried out will become apparent from the following description taken in conjunction with the accompanying drawing in which Fig. 1 diagrammatically illustrates in section a ventilation system incorporating the present invention and Figs. 2 and 3 diagrammatically illustrate in longitudinal section the general form and arrangement of a portion of the apparatus for controlling fluid flow in accordance with the present invention, the form of fluid flow under different conditions being represented in the figures by arrows.

Referring particularly to Fig. 1 of the drawing, the element designated 10 represents an electric discharge device which is excited from electric supply line 11 and which gives off heat during operation. It is to be understood that such a device is shown for purposes of illustration only and there may be substituted therefor any other heat dissipating device the temperature of which it is desired to maintain within given limits by the circulation of air thereover. The heat dissipating device is enclosed by means of a casing 12 which is provided with air intake and exhaust means illustrated as being in the form of ducts 13 and 14 respectively. These ducts are so constructed that their open ends are in spaced apart opposed relationship. Duct 13 is provided with an inwardly converging bell-shaped inlet opening 15 which facilitates the smooth flow of air thereinto.

In order that the temperature within casing 12 may be maintained within desired limits, there is provided a duct 16 and an arrangement of orifices and fans for controlling the proportions of fresh and recirculated air supplied to the casing. Duct 16 may assume various forms in the practice of my invention but is illustrated in its preferred embodiment as being in the form of a truncated cone having smooth walls diverging from its inlet or throat 17 to its outlet or mouth 18 which latter is disposed in opposed relationship to the inlet 15 of duct 13 and is spaced therefrom as indicated at 19. For best operation of the apparatus it is preferable, though not necessary, that the outlet 18 of duct 16 be of equal or slightly greater area than that of the inlet 15 of duct 13. The throat 17 of duct 16 extends into atmosphere.

Duct 16 constitutes one form of a diffuser which is a device well known in the art for converting velocity head of a fluid stream into static head. In order that such a diffuser be efficient in its operation, its structural characteristics must be such that the outer portions of a fluid stream flowing therethrough follow along the sides thereof in the form of substantially continuous unidirectional streams. In other words, the circumferential flow must be substantially laminar without the formation of eddies along the inner surfaces of the diffuser. To make the fluid follow the sides, the cross-sectional area of the diffuser must increase relatively gradually, and there must be no conditions present which cause eddies to form at the inlet of the diffuser. In accordance with well known principles, the walls of the diffuser illustrated are made to have an angle with the axis of the diffuser which is less than that at which the outer laminae of a fluid stream entering the throat 17 substantially uniformly distributed across the area of the throat with all portions thereof flowing at substantially equal velocity and along lines substantially parallel to the axis of the diffuser, will cease to contact the walls of the diffuser. As is well known to one skilled in the art, this angle will generally be about 7°.

The throat 17 of the diffuser duct 16 is provided with an inlet orifice b which has a sharp edge on the inlet side thereof and is therefore of the type commonly designated as sharp-edged. It is well known in the art that such sharp-edged orifice has a relatively low orifice coefficient for the normal flow of fluid therethrough from a body of fluid which is in extended contact with the margin of the orifice on the inlet side thereof. Eddy currents are produced at the inlet of the diffuser by the rapid increase in the area of the actual fluid flow path through the diffuser, which eddy currents are introduced by the contraction of the fluid stream entering the throat 17 at an angle to the axis of the diffuser and through the sharp edges of orifice b.

Opposite the inlet 17 of duct 16 is a conduit 20 having an inwardly converging bell-shaped inlet 21 and an outlet in the form of a round edged discharge orifice a. The inlet 21 of conduit 20 is disposed in opposed relationship to the outlet 22 of duct 14 and spaced therefrom as indicated at 23 while the discharge orifice a is in axial alignment with the inlet 17 of duct 16 and spaced therefrom as indicated at S. For best operation of the apparatus it is preferable that the inlet 23 of conduit 20 have a slightly greater area than the outlet 22 of duct 14. The axial alignment of orifices a and b provides for the projection of fluid from conduit 20 into duct 16 and it is preferable also, for reasons which will become apparent hereinafter, that the orifice a, which is of the round-edged type and which therefore has a relatively high orifice coefficient, should have also a slightly larger area than that of the orifice b and a circular cross-sectional shape to correspond with the circular cross section of the duct 16.

For a more detailed description of the arrangement of duct 16 and its cooperating orifices and of the manner of determining the various dimensions and spacings of the apparatus, reference may be had to my previously referred to copending application. However, sufficient of the details of arrangement and operation of the apparatus will be given herein to insure an adequate understanding of the specific invention to which the present application is directed.

For the purpose of describing the operation of the apparatus embodying the present invention, attention is directed particularly to Figs. 2 and 3, and it will be assumed that the apparatus therein illustrated is to be employed to control the flow of air to a space C, adjacent the outlet 18 of the duct 16, from a space A interiorly of conduit 20 and from atmosphere which is designated as the space B surrounding the apparatus.

If the space A within conduit 20 is subjected to a positive pressure, a pressure above atmospheric, air is discharged therefrom through orifice a into the orifice b at the throat 17 of diffuser duct 16. Also, if the space C at the discharge end 18 of duct 16 is subjected to negative pressure, a pressure below atmospheric, there is a tendency for air to be drawn into the throat 17 of the diffuser through the space S from atmosphere B, and as will be pointed out hereinafter, the amount of air drawn in from atmosphere depends principally upon the difference between the pressures of space A and of space B. When space C is under negative pressure and space A under positive pressure, a stream of air is discharged through orifice a into the throat 17 of duct 16 as indicated by the arrows in Fig. 2 which are representative of the flow lines of the air stream. Since in the illustrated embodiment the orifice a is slightly larger than the orifice b and has the same cross-sectional shape, the rim of orifice b operates to core out the central portion of the stream discharged from orifice a and the outside portions or laminae of the stream are discharged outwardly through the space S and flow along the outer wall of the diffuser duct 16. This outer portion of the air stream flowing on the outside of the diffuser overcomes or blocks any tendency for air to be entrained into the inlet of the diffuser from the atmosphere B through the space S by means of the injector action of the stream flowing through the inlet of the diffuser. Consequently, the central portion of the stream flows into the inlet of the diffuser and is substantially uniformly distributed across the area thereof with all portions of the stream flowing at substantially uniform velocity and along lines substantially parallel to the axis of the diffuser. By proper adjustment of the sizes of orifices a and b and of space S with relation to each other, the discharge of air externally of the throat of the diffuser may be reduced to a minimum while the blocking effect thereof is maintained.

Under the conditions outlined in the previous paragraph, the orifice a in effect becomes the inlet of the diffuser and therefore the inlet orifice coefficient of the diffuser is substantially unity. Hence, the stream of air enters the throat of the diffuser with very slight loss in head and with substantially no contraction. Also, the diffuser being designed as previously pointed out so that it has maximum efficiency of operation when a fluid stream enters the throat thereof as just described, there being no eddy currents induced at the inlet thereof and the fluid stream flowing smoothly therethrough as indicated by the arrows in Fig. 2, the loss in head across the diffuser is a minimum. Consequently, under the positive pressure conditions a minimum of impedance is imposed to flow of air from the space A interiorly of conduit 20 to the space designated C, and for a given pressure drop across the apparatus a maximum air flow is secured.

On the other hand, when space A is under atmospheric pressure and space C is subjected to negative pressure, pressure lower than atmospheric, by any suitable means, a stream of air is no longer discharged from the orifice a into the throat 17 of the diffuser 16 in the manner previously described and the flow of air into the throat of the diffuser from atmosphere B through the space S is no longer blocked off. The orifice b then becomes the effective inlet of the diffuser and air flows from atmosphere into the diffuser at a relatively large angle to the axis thereof, as indicated by the arrows in Fig. 3, so that the low orifice coefficient at the diffuser inlet results in an appreciably larger loss in head at the inlet than was the case under the positive pressure condition outlined in the previous paragraph. In addition the contraction of the air stream entering the diffuser through the orifice b produces eddy currents along the walls of the diffuser, as indicated by the arrows in Fig. 3, which impede the flow of air through the diffuser and cause inefficient operation thereof and a consequent larger loss in head thereacross. The total loss in head across the apparatus under the negative pressure conditions due to the effect of the sharp-edged orifice b and the inefficient operation of the diffuser is many times larger than the total loss in head across the apparatus under the positive pressure conditions. In fact, it has been ascertained that the magnitudes of negative pressure required to produce given rates of air flow through the apparatus are in the neighborhood of 18 to 20 times greater than the magnitudes of positive pressure necessary to produce the same rates of air flow through the apparatus.

When the space C is subjected to a constant negative pressure at the same time that the space A is subjected to a variable positive pressure, as the pressure within the space A decreases the force of the discharge through the orifice a also decreases with resultant decrease in the blocking effect produced thereby at the space designated S. A point is reached at which air begins to flow in increasing quantities through space S from atmosphere B into the throat 17 of the diffuser 16 and the impedance to the flow of air through the diffuser thereafter increases as the pressure in space A decreases. Hence it will be seen that variation of the differential between the pressure of space A and space B intermediate zero differential and the differential at which air just begins to flow into the diffuser inlet from space B, produces variation in the impedance to flow through the diffuser which is inversely in proportion to a function of the differential.

From an understanding of the principles underlying my invention as set forth in the foregoing discussion and as set forth more in detail in my previously referred to copending application, it will be evident to one skilled in the art that the present invention is not limited to the exemplary forms of the discharge orifice a, space S and diffuser duct 16 described and illustrated herein, and that the apparatus for practicing the invention may take various forms whereby may be secured different degrees of variation in impedance or restriction of the fluid flow through the apparatus upon changeover from positive to negative pressure conditions or vice versa.

In order to circulate air through casing 12 and over the heat dissipating device 10, there is provided a fan 24 located in the inlet 15 of duct 13 and driven by means of an electric motor 25 which is connected to be energized from electric supply line 26. This fan 24 serves also to impose a negative pressure upon the space C. A similar fan 27 is located in conduit 20 adjacent the inlet 21 thereof and is arranged to be driven by means of an electric motor 28, also connected to be energized from supply line 26. Motor 25 is connected directly to supply line 26 in order that when energized it rotates at constant speed causing fan 24 to force a constant volume of air into the intake duct 13 and through casing 12. On the other hand, it is desirable for reasons to be given hereinafter that fan 27 be operated at different speeds and hence motor 28 is connected to supply line 26 through some form of speed control device, such as the variable resistance 30 and movable contact mechanism 31 diagrammatically shown in Fig. 1. Contact 31 is mounted on the movable end of a thermostatic device 32 which is represented for example as being of the expansible fluid bellows type having one end 33 thereof extending within casing 12 in proximity to the heat dissipating device 10 to be responsive to the heat dissipated therefrom during operation. The resistance 30, contact 31, and thermostatic device 32, constitute a thermal responsive speed control device for motor 28. Both motor 25 and motor 28 may be disconnected from supply line 26 by means of a manually operable switch 34.

The apparatus illustrated in Fig. 1 may be employed to maintain the electric discharge device 10 at a certain constant temperature or within a certain temperature range regardless of the ambient temperature outside casing 12. This is accomplished by varying the proportions of recirculated air and makeup air supplied to the casing by means of fan 24. Under certain conditions the amount of recirculated air must be substantially zero and for other conditions the amount of makeup air must be substantially zero. Intermediate those extreme conditions it is desirable to obtain variations of the relative proportions of recirculated and makeup air in accordance with variations in the load conditions on the electric discharge device and variations in the ambient temperature surrounding casing 12. Motor 25 and fan 24 operate at constant speed, when switch 34 is closed, to supply a constant volume of cooling air through casing 12. The function of fan 27 and motor 28 is to control the proportions of recirculated air and fresh air going to make up this constant volume of air supplied to casing 12. The energization of motor 28 and the speed of operation of fan 27 are controlled by means of the cooperative action of the variable resistance 30 and movable contact 31 which is movable in accordance with temperature variations within casing 12.

The thermostatic device 32 may be so adjusted that when electric discharge device 10 is operating at a proper temperature, all of resistance 30 is cut out so that motor 28 receives maximum excitation which results in rotation of fan 27 at maximum speed. Under these conditions fan 27 draws a large volume of spent or recirculated air from exhaust duct 14 and discharges this air through the orifice a into the inlet orifice b of diffuser duct 16 in such manner, as previously described, that the impedance imposed to the flow of the recirculated air through orifice a and diffuser 16 is a minimum. This recirculated air therefore is supplied in large volume to the space C at the outlet 18 of the diffuser and constitutes the major portion of the air drawn into the intake duct 13 by means of fan 24 so that a very small volume of makeup or fresh air is drawn into the inlet 15 of duct 13 from atmosphere through the space designated 19.

On the other hand, when the temperature of the air surrounding the electric discharge device 10 reaches a predetermined high limiting degree, thermostatic element 32 operates to insert a maximum of resistance 30 or to completely open the circuit of motor 28 so that it will operate at its lowest speed or not at all. Under these conditions fan 27 and restricted orifice a offer such impedance to flow of air through conduit 20 that substantially all of the spent or recirculated air from casing 12 is discharged from the outlet 22 of duct 14 through the space 23 into atmosphere.

Also, since fan 27 no longer operates to discharge any appreciable stream of air through the orifice *a* into the orifice *b*, the space S is no longer blocked off and air flows therethrough into the inlet orifice *b* of diffuser 16 at an angle to the axis of the diffuser and, as previously described, imposes a high impedance to flow of air through the diffuser and thus further decrease the volume of spent air passing from the duct 14 through conduit 20 and diffuser 16 to the inlet 15 of duct 13. Hence, since the impedance to flow of air through the diffuser is now at its maximum, fan 24, in order to force a constant volume of cooling air through duct 13 and casing 12, draws a large volume of makeup air from atmosphere into the inlet 15 of duct 13 through space 19, thus providing maximum cooling of the electric discharge device 10.

For temperatures of the electric discharge device intermediate the limits previously mentioned, the thermostatic element 32 operates to insert varying amounts of resistance 30 into the circuit of motor 28 which results in the operation of the motor at variable speeds and fan 27 is effective to discharge varying amounts of spent or recirculated air through the orifice *a* into the inlet of diffuser 16. Under these conditions, the impedance to flow of spent air through the diffuser varies substantially inversely in proportion to the amount of said air which is discharged from orifice *a*, and the amount of makeup air drawn into the inlet 15 of duct 13 through space 19 varies substantially inversely in proportion to the amount of air passing through the diffuser duct. Hence it will be seen that the flow control apparatus of the present invention provides a very sensitive control of the relative proportions of recirculated and makeup air supplied to casing 12 for cooling the electric discharge device 10 or other heat dissipating device and accomplishes this control without employing movable parts such as the usual movable vanes and shutters.

While I have shown and described my present invention in connection with a specific embodiment thereof, it is to be understood that I do not wish to be limited to the details of the illustrated embodiment since it is apparent that the principles herein disclosed are susceptible of numerous other applications, and that modifications may be made in the arrangement and structure of the elements of the fluid flow control apparatus without departing from the spirit and scope of my invention as defined in the appended claims.

What I claim as new and desire to secure by Letters Patent of the United States is:

1. In combination, an enclosure having an intake opening, means for drawing air into said opening and circulating the air through the enclosure, means for conducting air to said opening including a fluid pressure diffuser duct having its outlet end in opposed spaced proximity to said opening and having its inlet in the form of a substantially sharp-edged orifice, means for exhausting from said enclosure a portion of the air circulated therethrough and for discharging said portion of air into the inlet orifice of said diffuser duct in the form of a stream substantially uniformly distributed over the area of the inlet orifice with all parts of the stream flowing at substantially equal velocities along lines substantially parallel to the axis of the inlet orifice, means providing for the release from the enclosure of the remainder of the air circulated through the enclosure, and means for varying the operation of said discharging means.

2. In a ventilation system, the combination of an enclosure to be ventilated having intake means communicating with atmosphere, a duct having an inlet in the form of a sharp-edged orifice and an outlet in communication with said intake means, means operable for circulating a substantially constant volume of air through the enclosure from said intake means and for creating a negative pressure at the outlet of said duct, means variably operable for exhausting variable portions of said volume of circulated air from the enclosure and for discharging said portions of circulated air into the inlet orifice of said duct in the form of a stream substantially uniformly distributed over the area of the orifice with all parts of the stream flowing at substantially equal velocities along lines substantially parallel to the axis of the orifice, means providing for the relief of the remainder of the circulated air to atmosphere and means operative responsively to variation in a predetermined condition within the enclosure for controlling the operation of said variably operable means to thereby vary the quantity of circulated air discharged into said duct.

3. In a ventilation system, the combination of an enclosure to be ventilated having air intake means communicating with atmosphere and air exhaust means including means providing relief to atmosphere and other means providing a discharge orifice, means for circulating a substantially constant volume of air through the enclosure, means variably operable for discharging variable portions of said volume of circulated air from the enclosure through said orifice, means for returning circulated air through the enclosure including a fluid duct having a sharp-edged inlet orifice in axially aligned spaced relation with said first orifice to receive the circulated air discharged therefrom and also having substantially smooth inner walls extending from said inlet orifice with an outlet in communication with said intake means, said inlet orifice having less area than and substantially the same cross sectional shape as said first orifice, and means operative responsively to variations of a predetermined condition within the enclosure for varying the operation of said variably operable means to thereby regulate the volume of circulated air discharged from said first orifice into the inlet orifice of said duct.

4. A ventilation system including in combination an enclosure to be ventilated having intake and exhaust openings in communication with atmosphere and a fan operable for drawing a substantially constant volume of air in through said intake opening and to circulate said volume of air through the enclosure, a hollow casing having an inlet in spaced relation with said exhaust opening to receive circulated air therefrom and having an outlet in the form of a fluid discharge orifice, a second fan operable for causing flow of circulated air from said exhaust opening into said casing and for discharging said last mentioned air from said casing through said orifice, a fluid duct having an inlet in the form of sharp-edged orifice in spaced axial alignment with said first orifice to receive air discharged therefrom and having an outlet disposed to discharge air from said duct adjacent said intake opening, said orifices having substantially the same cross sectional shape with said inlet orifice having less area than said discharge orifice, and means operative responsively to variations in a predetermined condition within the enclosure for varying the operation of said second fan to thereby vary the quantities of circulated air discharged from said casing into said ducts and thence into proximity to said intake means.

5. In a ventilation system, the combination of an enclosure to be ventilated having air intake means communicating with atmosphere and air exhaust means including means providing relief to atmosphere and other means providing a fluid discharge orifice, means for circulating a substantially constant volume of air through the enclosure, means variably operable for discharging variable portions of said volume of circulated air from the enclosure through said orifice, means for returning circulated air to the enclosure including a diffuser duct having its inlet in axially aligned spaced relation with said orifice to receive the circulated air discharged therefrom and its outlet in communication with said intake means, the inlet of said diffusing duct having less area than and substantially the same cross sectional shape as said orifice, and means operative responsively to variations of a predetermined condition within the enclosure for varying the operation of said variably operable means to thereby vary the amount of circulated air discharged from said orifice into the inlet of said diffusing duct.

KENTON D. McMAHAN.